(12) United States Patent
Yang et al.

(10) Patent No.: US 11,657,435 B2
(45) Date of Patent: May 23, 2023

(54) INFORMATION PROCESSING SYSTEM, INFORMATION PROCESSING APPARATUS, AND SERVER

(71) Applicant: FUJIFILM BUSINESS INNOVATION CORP., Tokyo (JP)

(72) Inventors: Dawei Yang, Kanagawa (JP); Takuya Deguchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/806,156

(22) Filed: Mar. 2, 2020

(65) Prior Publication Data
US 2021/0090142 A1  Mar. 25, 2021

(30) Foreign Application Priority Data
Sep. 20, 2019  (JP) .............................. JP2019-172116

(51) Int. Cl.
*G06Q 30/04* (2012.01)
*G06Q 20/08* (2012.01)
(Continued)

(52) U.S. Cl.
CPC .............. *G06Q 30/04* (2013.01); *G06Q 10/10* (2013.01); *G06Q 20/085* (2013.01);
(Continued)

(58) Field of Classification Search
USPC .... 705/35, 44; 235/375, 379, 380, 382, 385, 235/454
See application file for complete search history.

(56) References Cited

U.S. PATENT DOCUMENTS

2003/0074312 A1* 4/2003 White .................... G06Q 30/04
705/40
2003/0101342 A1* 5/2003 Hansen .................. G06F 21/35
713/167
(Continued)

FOREIGN PATENT DOCUMENTS

CN   102903042 A   1/2013
CN   108347547 A   7/2018
(Continued)

OTHER PUBLICATIONS

Feb. 3, 2023 Office Action issued in Chinese Patent Application No. 202010095924.X.

*Primary Examiner* — William E Rankins
(74) *Attorney, Agent, or Firm* — Oliff PLC

(57) ABSTRACT

An information processing system includes a first apparatus, a second apparatus providing a service for fee, and a server. The first apparatus transmits, to the server, identification information and settlement destination information in an associated form, the identification information identifying use of the service, the settlement destination information stored on the first apparatus and identifying a settlement destination of a usage fee for the use of the service. The second apparatus transmits to the server the identification information and fee information in an associated form, the fee information indicating the usage fee for the use identified by the identification information. The server settles the usage fee indicated by the fee information at the settlement destination identified the settlement destination information associated with the identification information.

13 Claims, 7 Drawing Sheets

(51) Int. Cl.
   *G06Q 10/10* (2023.01)
   *H04W 12/06* (2021.01)
   *G06Q 40/02* (2023.01)
   *G06Q 20/40* (2012.01)
   *H04W 12/40* (2021.01)

(52) U.S. Cl.
   CPC ......... *G06Q 20/4014* (2013.01); *G06Q 40/02* (2013.01); *H04W 12/06* (2013.01); *H04W 12/40* (2021.01)

(56) References Cited

U.S. PATENT DOCUMENTS

| | | | |
|---|---|---|---|
| 2004/0147270 A1* | 7/2004 | Petrovich | G07G 1/0045 |
| | | | 455/414.1 |
| 2004/0190038 A1* | 9/2004 | Shahindoust | G07F 17/0014 |
| | | | 358/1.14 |
| 2011/0289027 A1* | 11/2011 | Moore | G06F 11/3051 |
| | | | 706/12 |
| 2013/0218920 A1* | 8/2013 | Satoh | G06F 16/24 |
| | | | 707/758 |
| 2014/0016160 A1* | 1/2014 | Chigusa | G06F 3/1297 |
| | | | 358/1.15 |
| 2017/0364872 A1* | 12/2017 | Rodoni | G06Q 10/06315 |
| 2018/0011666 A1 | 1/2018 | Yoshida | |

FOREIGN PATENT DOCUMENTS

| | | | | |
|---|---|---|---|---|
| CN | 109377212 A | * | 2/2019 | ........... G06Q 20/325 |
| JP | 2015-118586 A | | 6/2015 | |
| JP | 2016-139248 A | | 8/2016 | |
| JP | 2018-46494 A | | 3/2018 | |
| JP | 2018106569 A | * | 7/2018 | |
| JP | 2019155849 A | * | 9/2019 | |

* cited by examiner

FIG. 11
| TYPE OF SERVICE | UNIQUE INFORMATION | | | | | |
|---|---|---|---|---|---|---|
| | U001 | U002 | U003 | U004 | U005 | ··· |
| PRINT | YES | YES | YES | NO | NO | ··· |
| SCAN | YES | YES | YES | YES | NO | ··· |
| COPY | YES | YES | YES | NO | NO | ··· |
| FAX | YES | NO | NO | YES | YES | ··· |
FIG. 12
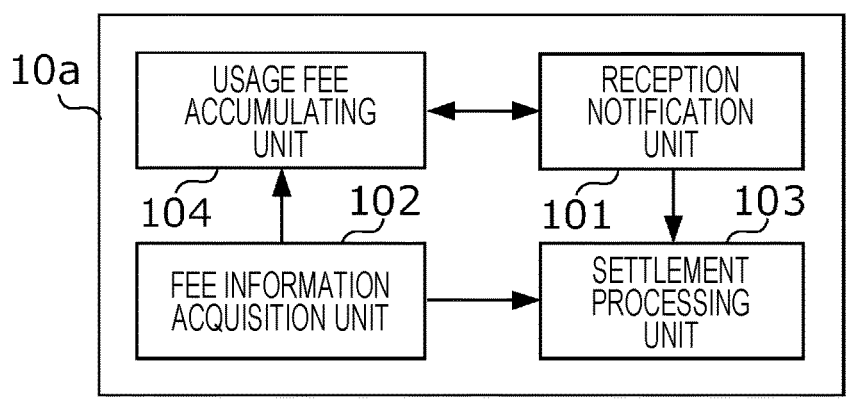
FIG. 13
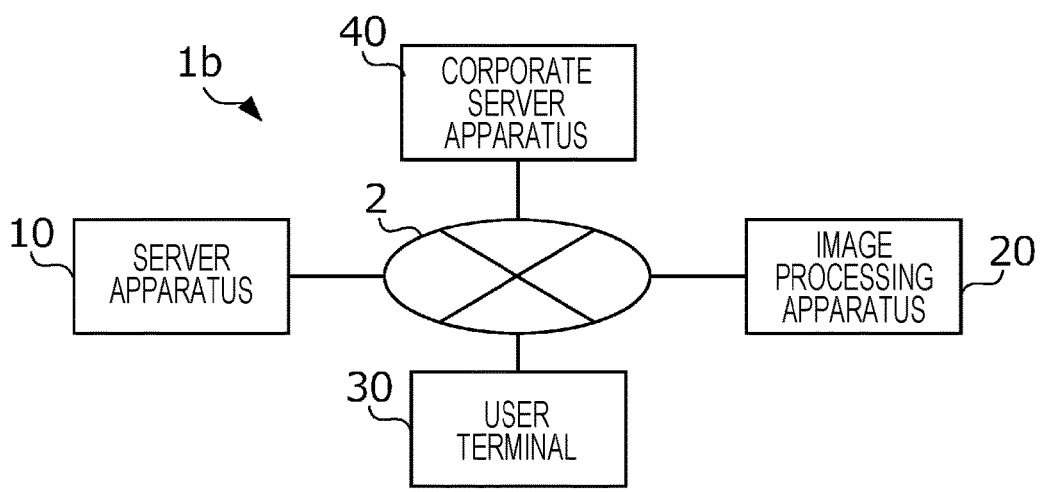

INFORMATION PROCESSING SYSTEM, INFORMATION PROCESSING APPARATUS, AND SERVER

CROSS-REFERENCE TO RELATED APPLICATIONS

This application is based on and claims priority under 35 USC 119 from Japanese Patent Application No. 2019-172116 filed Sep. 20, 2019.

BACKGROUND

(i) Technical Field

The present disclosure relates to an information processing system, an information processing apparatus, and a server.

(ii) Related Art

Japanese Unexamined Patent Application Publication No. 2015-118586 discloses a technique that exchanges a user name of an authenticated user among multi-function apparatuses in order to manage a log of a print job, uniquely managed by an application, in association with a log of an apparatus function.

In a settlement process, an entity, such as a company, may later pay a usage fee for use of an apparatus that provides a service for fee. The apparatus may be shared by a user in a company different from the first company. If information identifying a settlement destination (information identifying the first company) is stored on the apparatus, the information may possibly be leaked.

SUMMARY

Aspects of non-limiting embodiments of the present disclosure relate to allowing the usage fee for a service to be settled without storing information identifying a settlement destination on the apparatus providing a service for fee.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing system. The information processing system includes a first apparatus, a second apparatus providing a service for fee, and a server. The first apparatus transmits, to the server, identification information and settlement destination information in an associated form with the identification information identifying use of the service and with the settlement destination information stored on the first apparatus and identifying a settlement destination of a usage fee for the use of the service. The second apparatus transmits to the server the identification information and fee information in an associated form with the fee information indicating the usage fee for the use identified by the identification information. The server settles the usage fee indicated by the fee information at the settlement destination identified by the settlement destination information associated with the identification information.

BRIEF DESCRIPTION OF THE DRAWINGS

Exemplary embodiment of the present disclosure will be described in detail based on the following figures, wherein:

FIG. 11 illustrates an example of a usage availability table;

FIG. 12 illustrates a functional configuration implemented by a modification;

FIG. 13 illustrates a whole configuration of a settlement assisting system of a modification.

DETAILED DESCRIPTION

Figure 1:
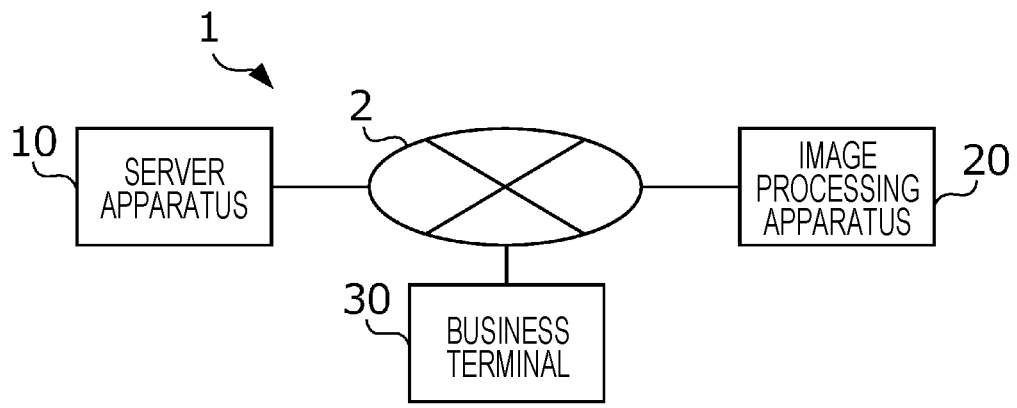
FIG. 1 illustrates a whole configuration of a settlement assisting system of the disclosure.

FIG. 1 illustrates the whole configuration of a settlement assisting system 1 of an exemplary embodiment. The settlement assisting system 1 assists in a settlement job of a fee for a service that a user has used in doing user's own job. The settlement assisting system 1 helps perform a later payment in which a payment is not performed when the user uses the service but later performed by an organization to which the user belongs.

The settlement assisting system 1 includes a communication network 2, server apparatus 10, image processing apparatus 20, and user terminal 30. The communication network 2 is a communication system including a mobile communication network and the Internet and relays data communication among apparatuses (including terminals and systems) that communicate with the settlement assisting system 1. The communication network 2 is wiredly connected to the server apparatus 10, image processing apparatus 20, and user terminal 30. The communication between each apparatus and the communication network 2 may be wireless or wired communication.

The image processing apparatus 20 provides a user (for example, a member of the corporation) with paid services involving image processing, such as printing, copying, scanning, and/or faxing of image data (hereinafter referred to as "image processing service"). The image processing apparatus 20 that provides a paid service is an example of a "second apparatus" of the disclosure. When the user uses the image processing service in the later payment, the image processing apparatus 20 transmits to the server apparatus 10 fee information indicating a usage fee for the image processing service in the later payment.

The server apparatus 10 performs a settlement process to assist in the settlement of fees for the image processing services and is an example of a "server" of the disclosure. The user terminal 30 is used when a user uses the image processing service in the later payment. The user terminal 30 is an example of a "first apparatus". The user terminal 30 performs a process to inform the server apparatus 10 of a settlement destination at which the usage fee for the image processing service is settled in the later payment (as described in detail later).

Figure 2:
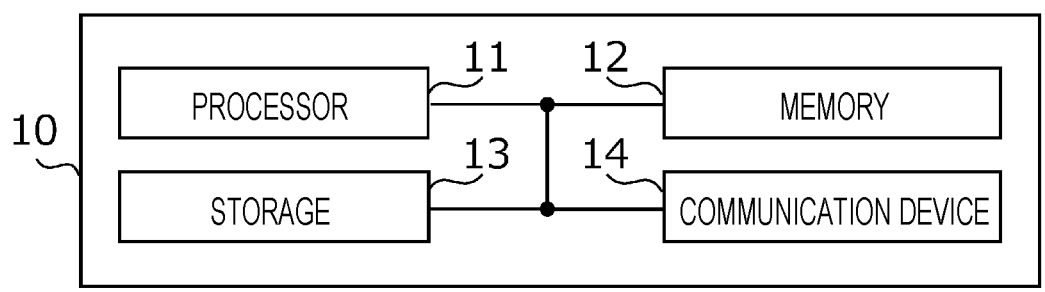
FIG. 2 illustrates a hardware configuration of a server apparatus.

FIG. 2 illustrates the hardware configuration of the server apparatus 10. The server apparatus 10 is a computer and includes a processor 11, memory 12, storage 13, and communication device 14. The processor 11 includes an arithmetic unit, such as a central processing unit (CPU), register, and peripheral circuit. The memory 12 is a recording medium readable by the processor 11 and includes a random-access memory (RAM) and read-only memory (ROM).

The storage 13 is a recording medium readable by the processor 11 and, for example, includes a hard disk drive or a flash memory. The processor 11 controls operation of each hardware element by using the RAM as a working area and by executing a program stored on the ROM or the storage 13. The communication device 14 is a communication medium performing communication via the communication network 2 and includes an antenna and a communication circuit.

Figure 3:
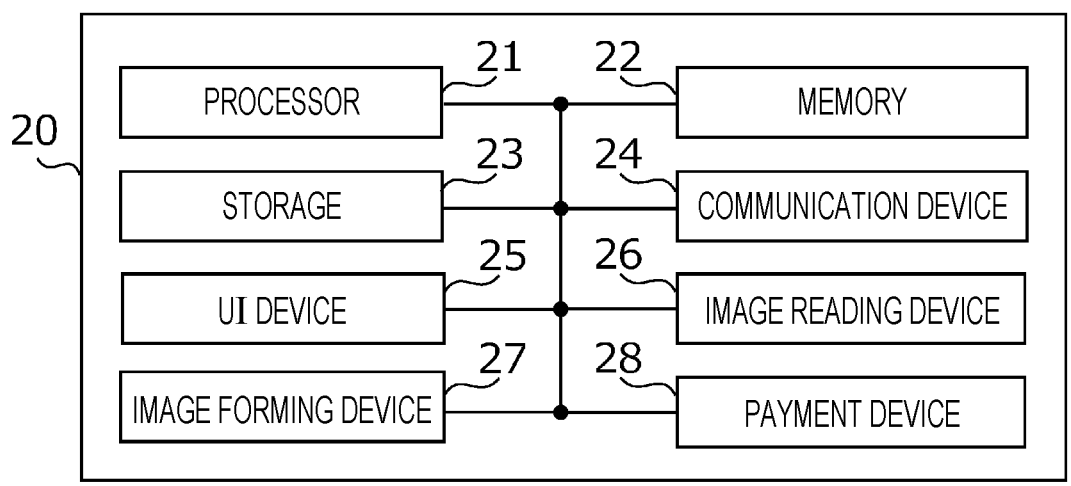
FIG. 3 illustrates a hardware configuration of an information processing apparatus.

FIG. 3 illustrates the hardware configuration of the image processing apparatus 20. The image processing apparatus 20 is a computer and includes a processor 21, memory 22, storage 23, communication device 24, user interface (UI) device 25, image reading device 26, image forming device 27, and payment device 28. The processor memory 22, storage 23, and communication device 24 are respectively identical to the processor 11, memory 12, storage 13, and communication device 14 in FIG. 2 in terms of hardware point of view.

The UI device 25 is an interface provided to a user who uses the image processing apparatus 20. For example, the UI device 25 includes a display and a touch screen having a touch panel arranged on the top face of the display. The UI device 25 displays an image while receiving an operation from the user. The UI device 25 also includes an operator, such as a keyboard, in addition to the touch screen and receives an operation performed on the operator.

The image reading device 26 is a hardware element (for example, a scanner) reading an image on a medium, such as a paper sheet, and is an image reading unit that reads an image from the medium set thereon. The image forming device 27 is a printer forming an image on a medium, such as a paper sheet and is thus an image forming unit. The image forming device 27 transfers and fixes an image to a medium in an electrophotographic system while transporting the medium set thereon and thus forms the image on the medium. The payment device 28 collects a fee the user has paid for the paid image processing service provided by the image processing apparatus 20.

Figure 4:
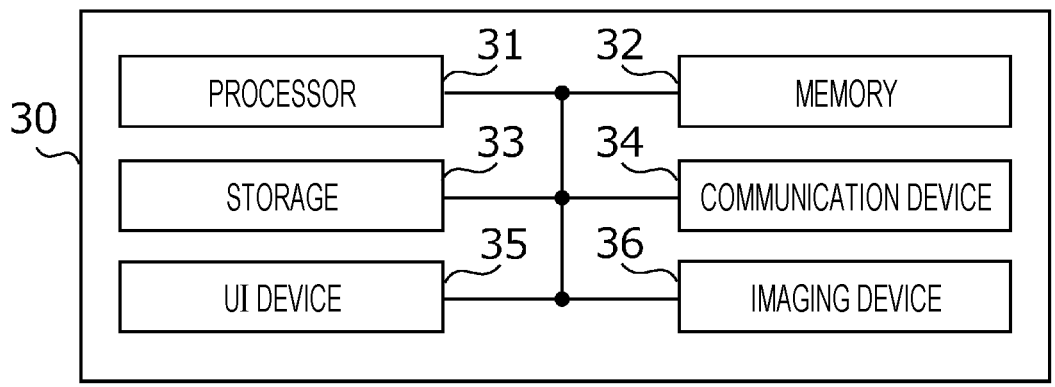
FIG. 4 illustrates a hardware configuration of a user terminal.

FIG. 4 illustrates the hardware configuration of the user terminal 30. The user terminal 30 is a computer and includes a processor 31, memory 32, storage 33, communication device 34, UI device 35, and imaging device 36. The processor 31, memory 32, storage 33, communication device 34, and UI device 35 are respectively identical to the processor 21, memory 22, storage 23, communication device 24, and UI device 25 in FIG. 3 in terms of hardware point of view. The imaging device 36 includes an optical system and an image sensor. An image that is formed on the image sensor via the optical system is displayed on a display of the UI device 35. If an operation for imaging is performed under this condition, the imaging apparatus 36 stores image data indicating the formed image on the storage 33 in an imaging process.

The settlement ting system 1 implements functions described below when the processor in each apparatus executes the program thereof and thus controls elements in each apparatus. The operation of each function is described as an operation performed by the processor in each apparatus that implements the function.

Figure 5:
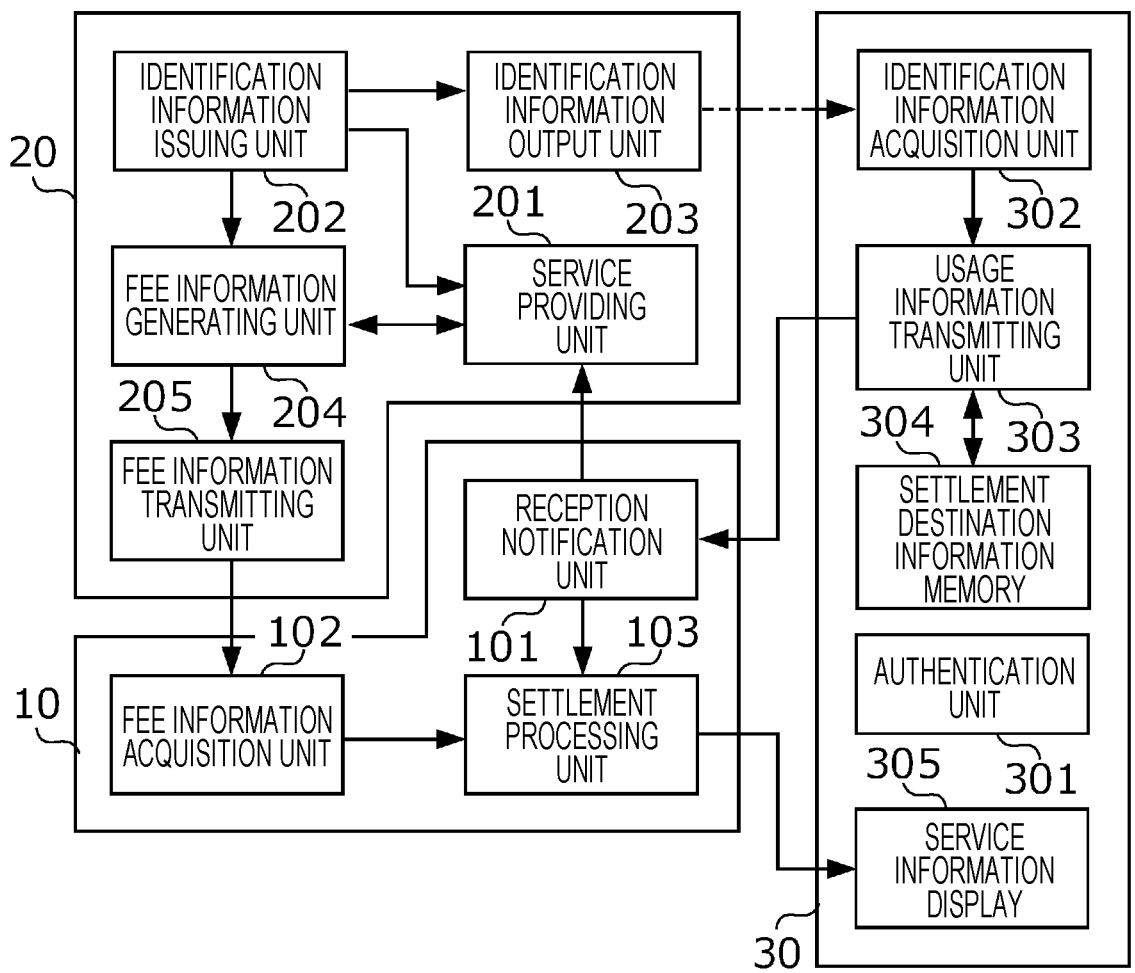
FIG. 5 illustrates a functional configuration of the settlement assisting system.

FIG. 5 illustrates the functional configuration of the settlement assisting system 1. The server apparatus 10 includes a reception notification unit 101, fee information acquisition unit 102, and settlement processing unit 103. The image processing apparatus 20 includes a service providing unit 201, identification information issuing unit 202, identification information output unit 203, fee information generating unit 204, and fee information transmitting unit 205, The user terminal 30 includes an authentication unit 301, identification information acquisition unit 302, usage information transmitting unit 303, settlement destination information memory 304, and service information display 305.

The service providing unit 201 in the image processing apparatus 20 provides the image processing service as a service for fee (paid service). The service providing unit 201 is an example of a "providing unit" of the disclosure. The service providing unit 201 causes a display of the image processing apparatus 20 to display a selection screen. The selection screen allows the user to select a payment method for the usage fee for the image processing service between the "later payment" and a "direct payment" in which the fee is directly paid to the payment device 28 in FIG. 3.

Figure 6:
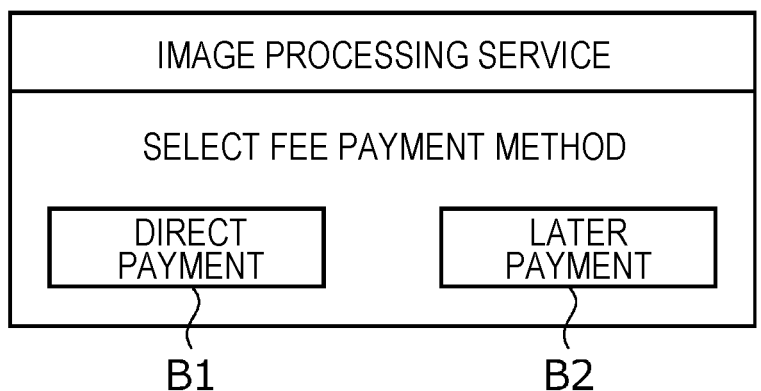
FIG. 6 illustrates an example of a selection screen of a payment method.

FIG. 6 illustrates an example of the selection screen of the payment method. The service providing unit 201 causes a selection button B1 for the direct payment and a selection button B2 for the later payment. If the user has selected the selection button B1, the service providing unit 201 provides the image processing service if the usage fee calculated in accordance with a setting selected by the user is paid to the payment device 28 in FIG. 3.

If the user has selected the selection button B2, the service providing unit 201 instructs the identification information issuing unit 202 to start a process for the later payment. The identification information issuing unit 202 then issues the identification information identifying the use of the image processing service provided by the image processing apparatus 20. The word use herein indicates the use of the image processing service by the user who has selected the later payment and thus indicates the use of the image processing service from when the selection button B2 is operated to when a usage end button to be described later is operated.

Upon receiving the instruction from the service providing unit 201, the identification information issuing unit 202 issues a later payment identification (ID) as the identification information. The later payment ID may be any information as long as the information is able to individually identify each later payment ID. The identification information issuing unit 202 supplies the later payment ID to the identification information output unit 203.

The identification information output unit 203 outputs the supplied later payment ID, namely, the identification information that identifies the use of the image processing service provided by the image processing apparatus 20. In accordance with the exemplary embodiment, the identification information output unit 203 converts the identification information into a two-dimensional code that represents the received later payment ID and an apparatus ID assigned to the image processing apparatus 20, The identification information output unit 203 outputs the two-dimensional code obtained through the conversion to the display of the image processing apparatus 20 and causes the two-dimensional code to be displayed on the display.

Figure 7:
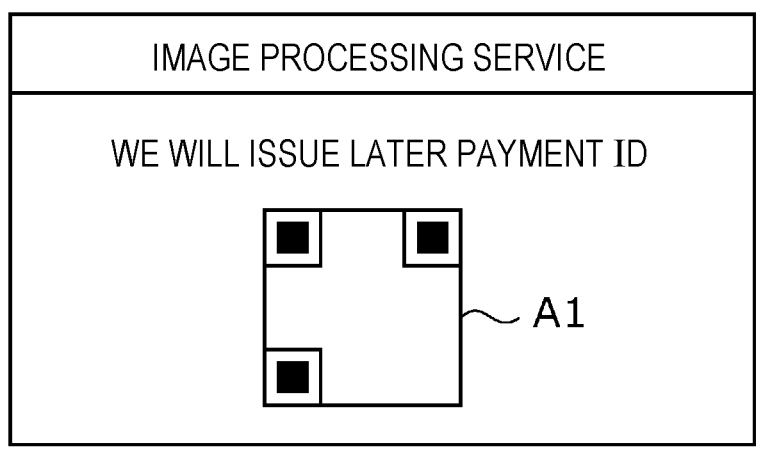
FIG. 7 illustrates an example of identification information displayed.

FIG. 7 illustrates an example of the identification information displayed. Referring to FIG. 7, the identification information output unit 203 outputs two-dimensional code A1 as the identification information to the display. The two-dimensional code A1 is an example of "code information" of the disclosure. The two-dimensional code A1 displayed is read by the user terminal 30. The user terminal 30 stores an application program (hereinafter referred to as "app") to perform a process related to the later payment.

Figure 8A:
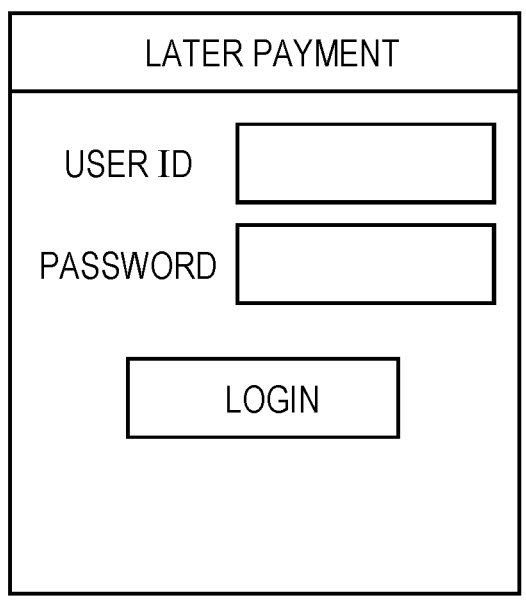
FIGS. 8A and 8B illustrate an example of a screen of a later payment application.
Figure 8B:
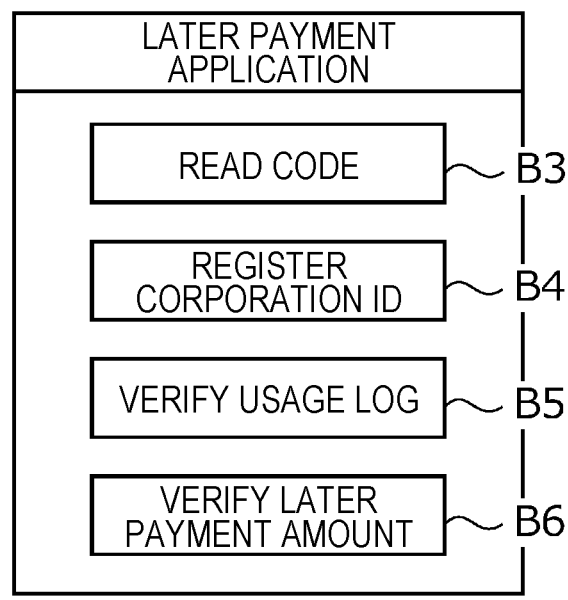

FIGS. 8A and 8B illustrate an example of the screen of the later payment app. The screen for the later payment app is displayed in two-phased screens. FIG. 8A illustrates a first phase screen to authenticate a user. The authentication unit 301 in the user terminal 30 authenticates the user of the user terminal 30. Referring to FIG. 8A, the authentication unit 301 causes the display to display an input screen on which a user ID and password are to be input to authenticate the user.

The user ID and password of the user who is permitted to use the image processing service in the later payment are registered on the settlement assisting system 1. If the user enters the user ID and password, the authentication unit 301 transmits the input user ID and password to an authentication server (not illustrated). If the user is authenticated by the authentication server, the authentication unit 301 starts up the later payment app and causes a second phase screen to be displayed as illustrated in FIG. 8B.

Referring to FIG. 8B, a code read button B3, corporate ID registration button B4, usage log verification button B5, and later payment verification button B6 are displayed. If the code read button B3 is operated, the user terminal 30 starts up the imaging device 36 thereof. The identification information acquisition unit 302 in the user terminal 30 reads the later payment ID and apparatus ID from the two-dimensional code displayed on the display by the imaging device 36.

The identification information acquisition unit 302 acquires the read apparatus ID and later payment ID as the identification information. In this way, the user terminal 30 authenticates the user of the user terminal 30 and thus acquires the identification information via the function (in the exemplary embodiment, the identification information acquisition unit 302) that is available if the user is authenticated. This arrangement controls more unauthorized use of the image processing service by a third party than when the user terminal 30 acquires the identification information even without the authentication operation.

The identification information acquisition unit 302 supplies the acquired apparatus ID and later payment ID to the usage information transmitting unit 303. The usage information transmitting unit 303 transmits to the server apparatus 10 the identification information acquired by the identification information acquisition unit 302 in association with settlement destination information stored on the user terminal 30. The settlement destination information is used to identify a settlement destination of a usage fee for the use identified by the identification information acquired by the identification information acquisition unit 302.

The settlement destination information may be an organization, such as a company, a division of the company, or a project of the division. The company has a budget to perform business and the usage fee for the business use is paid from the budget. The settlement destination information memory 304 stores the settlement destination information identifying settlement destinations. In accordance with the exemplary embodiment, the settlement destination information memory 304 stores as the settlement destination information the corporate ID of a company, that settles the usage fee.

The settlement destination information memory 304 stores the corporate ID that has been registered by using the corporate ID registration button B4 in FIG. 8B. The settlement destination information is not limited to the corporate ID but may be a division code or project code that may serve as a unit in the settlement in the company. Any information serving as a unit in the settlement in the company may be used, for example, an employee ID or a terminal ID of the user terminal 30 may be used.

When the identification information is received from the identification information acquisition unit 302, the usage information transmitting unit 303 reads the settlement destination information from the settlement destination information memory 304. The usage information transmitting unit 303 generates, as usage information related to the use of the image processing service, information including the received identification information and the read settlement destination information. The usage information transmitting unit 303 transmits the generated usage information to the server apparatus 10.

The user terminal 30 authenticates the user of the user terminal 30 (also the user of the image processing service) and transmits the identification information and settlement destination information to the server apparatus 10 via the function (by the usage information transmitting unit 303 in accordance with the exemplary embodiment) that is available if the user has been authenticated. This arrangement controls more unauthorized use of the image processing service by a third party than when the identification information and settlement destination information are transmitted without the authentication operation.

The reception notification unit 101 in the server apparatus 10 acquires from the user terminal 30 the received usage information, namely, the identification information identifying the use of the image processing service by the user of the image processing apparatus 20 and the settlement destination information identifying the settlement destination of the usage fee for the user. The image processing apparatus 20 that provides the image processing service for fee is an example of a "providing apparatus" of the disclosure and the user terminal 30 is an example of an "external apparatus" of the disclosure. The reception notification unit 101 is an example of a "first acquisition unit" of the disclosure.

The reception notification unit 101 pre-stores the settlement destination information registered in the settlement assisting system 1. If the settlement destination information matching the acquired settlement destination information is stored, the reception notification unit 101 accepts the use of the image processing service in the later payment and then notifies the image processing apparatus 20 that the use of the image processing service has been accepted. The reception notification unit 101 stores the apparatus ID and the destination of the image processing apparatus 20 in the settlement assisting system 1 in association with each other.

The reception notification 101 transmits, to the destination associated with the apparatus ID indicated by the received usage information, notification data indicating notification contents and the later payment ID. Upon receiving the notification data, the service providing unit 201 in the image processing apparatus 2 determines that the use of the image processing service having the later payment ID indicated by the notification data has been accepted and starts providing the image processing service to the user.

The serve apparatus 10 thus transmits the later payment ID received from the user terminal 30 as the identification information to the image processing apparatus 20 and the image processing apparatus 20 starts providing the image processing service if the later payment ID has been received from the server apparatus 10. The service providing unit 201 causes the display in the image processing apparatus 20 to display a screen (such as a menu screen and a setting screen) that is used to use the image processing service. If the user performs an operation for the selection and setting of the image processing service on the screen, the service providing unit 201 provides the image processing service responsive to the operation.

Once print, copy, scan or fax service starts to be provided, the service providing unit 201 continues to provide the image processing service until a predetermined end condition is satisfied. In accordance with the exemplary embodiment, the service providing unit 201 determines that the end condition is satisfied if the user performs an operation to end the use of the image processing service. The service providing unit 201 causes to be displayed the screen that allows the user to determine whether to continue to use the image processing service.

Figure 9:
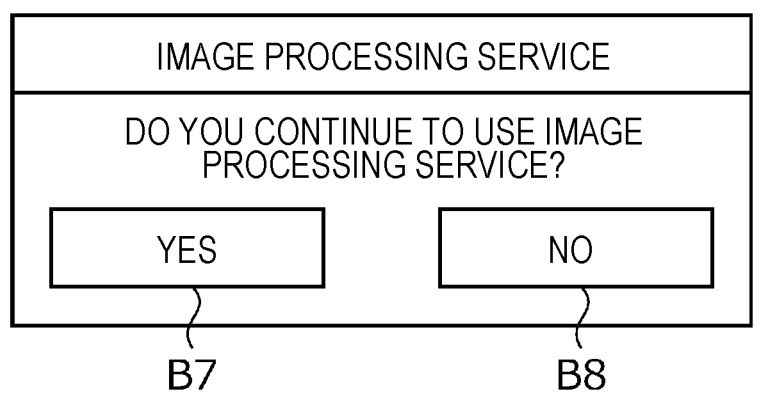
FIG. 9 illustrates a selection screen for continuous use.

FIG. 9 illustrates a selection screen for continuous use. The service providing unit 201 is used to display a character string "Do you continue to use image processing service?", yes button 37, and no button 38. If the yes button 37 is operated, the service providing unit 201 continuously provides the image processing service. If the no button 38 is operated, the service providing unit 201 determines that the end condition is satisfied and ends the image processing service in the later payment.

When the image processing service ends, the service providing unit 201 supplies to the fee information generating unit 204 a log of operations performed in the image processing service (such as job log). The operation log indicates information on the number of images processed in the image processing service, size and count of printed paper sheets, and color setting and serves as a base on which the usage fee is calculated. In other words, the operation log indirectly represents the usage fee for the image processing service.

The fee information generating unit 204 receives the issued later payment ID from e identification information issuing unit 202. The fee information generating unit 204 acquires the received later payment ID as the identification information identifying the use of the image processing service. The fee information generating unit 204 is an example of an "acquisition unit" of the disclosure. In accordance with the exemplary embodiment, the fee information generating unit 204 generates, as the fee information indicating the usage fee for the use identified by the acquired later payment ID, information indicating the operation log from the service providing unit 201. The fee information generating unit 204 is an example of a "generating unit" of the disclosure.

The fee information generating unit 204 supplies the acquired later payment ID together with the generated fee information to the fee information transmitting unit 205. The fee information transmitting unit 205 transmits the supplied later payment ID and fee information to the server apparatus 10. The fee information transmitting unit 205 is an example of a "transmitting unit" of the disclosure. As described above, the image processing apparatus 20 transmits to the server apparatus 10, as the fee information, the information indicating the usage fee from the beginning of the provision of the image processing service until the end condition is satisfied.

The fee information acquisition unit 102 in the server apparatus 10 acquires the transmitted later payment ID and fee information. The later payment ID and fee information thus acquired are respectively the identification information identifying the use of the image processing service by the user and the fee information indicating the usage fee for the use identified by the identification information. The fee information acquisition unit 102 is an example of a "second acquisition unit" of the disclosure. The fee information acquisition unit 102 supplies the acquired later payment ID and fee information to the settlement processing unit 103. The settlement processing unit 103 is also supplied with the unique information by the reception notification unit 101.

In accordance with the supplied information, the settlement processing unit 103 performs a settlement process to settle the usage fee for the image processing service. Specifically, the settlement processing unit 103 settles the usage fee, indicated by the fee information acquired by the fee information acquisition unit 102, at a settlement destination identified by the settlement destination information associated with the later payment ID common to that fee information. The settlement processing unit 103 is an example of a "processing unit" of the disclosure.

The settlement processing unit 103 stores a settlement table. The settlement table associates a corporate ID indicated by the settlement destination information with a destination to a business system that performs a payment operation in a company that serves as the settlement destination identified by the corporate ID. If the settlement destination information is a division code, project code, employee ID, or terminal ID, the corporate ID is associated with the business system, as the destination, of the division indicated by the division code, of the project indicated by the project code, of the employee indicated by the employee ID, or of the company to which the employee using the user terminal 30 belongs.

In accordance with the exemplary embodiment, the settlement processing unit 103 calculates the usage fee from the operation log indicated by the supplied fee information. The settlement processing unit 103 identifies the settlement destination from the settlement destination information in accordance with the stored settlement table. The settlement processing unit 103 then transmits, to the business system that settles at the identified settlement destination, instruction data instructing the business system to pay the calculated usage fee at a predetermined payment destination (for example, an account of an image processing service provider). The payment of the usage fee in the later payment is thus complete when the business system has paid the usage fee in accordance with the instruction.

In every predetermined settlement period (for example, every month), the settlement processing unit 103 performs a settlement process on all the image processing services in the later payment performed. The settlement processing unit 103 may perform the settlement process in the settlement period that is different according to the settlement destination or may perform the settlement process each time the corresponding company has given a settlement instruction.

The service information display 305 in the user terminal 30 displays information on the image processing service used by the user. If the verification button B5 or B6 in FIG. 8B is operated, the service information display 305 transmits to the server apparatus 10 inquiry data that inquires of the usage log of the image processing service a user who has logged in or inquires of a later payment amount of the user. Upon receiving the inquiry data, the settlement processing unit 103 in the server apparatus 10 returns answer data responsive to the inquiry of the usage log of the image processing service or the later payment amount of the user.

The settlement processing unit 103 may give as an answer the usage log and later payment amount that has not yet undergone the settlement process and may additionally give as an answer the usage log and later payment amount that has undergone the settlement process. The service information display 305 displays the usage log or the later payment amount indicated by the returned answer data. With this displayed data, the user verifies the status of the later payment which the user has used.

Figure 10:
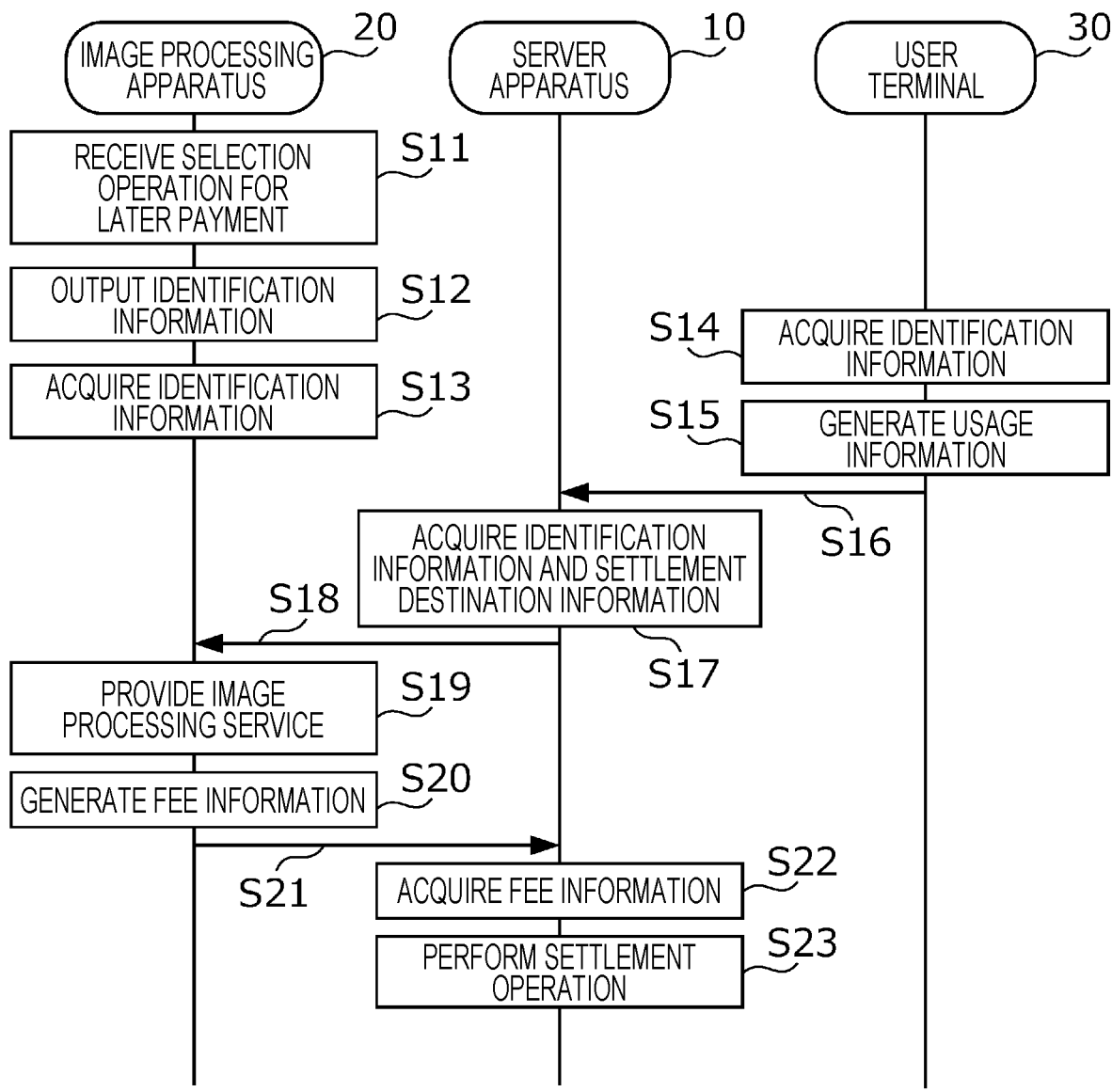
FIG. 10 illustrates an example of a later payment settlement process.

Each apparatus configured in the settlement assisting system 1 performs a later settlement process. In the later settlement process, the usage fee for the provision of the image processing service is later settled. FIG. 10 illustrates an example of a later payment settlement process. The image processing apparatus 20 (the service providing unit 201) receives an operation to select the later payment on the screen in FIG. 6 as a payment method (step S11).

The image processing apparatus 20 (the identification information issuing unit 202 and the identification information output unit 203) issues a later payment ID as the identification information identifying the use of the image processing service, converts the later payment ID into a two-dimensional code, and then outputs the two-dimensional code to the display (step S12). In this case, the image processing apparatus 20 (the fee information generating unit 204) acquires the issued identification information (step S13). In response to an operation performed by the user, the user terminal 30 (the identification information acquisition unit 302) reads the two-dimensional code output to the display and thus acquires the identification information (step S14).

The user terminal 30 (the usage information transmitting unit 303 and the settlement destination information memory 304) generates usage information including the read identification information and stored settlement destination information (step S15) and then transmits the generated usage information to the server apparatus 10 (step S16). The server apparatus 10 (the reception notification unit 101) acquires the identification information and settlement destination information indicated by the received usage information (step S17).

The server apparatus 10 (the reception notification unit 101) accepts the use of the image processing service in the later payment and transmits to the image processing apparatus 20 notification data notifying that the use has been accepted (step S18). Upon receiving the notification data indicated by the notification data, the image processing apparatus 20 (the service providing unit 201) provides the image processing service until the operation to end the use in FIG. 8 is performed (step S19).

The image processing apparatus 20 (the fee information generating unit 204) generates, as the fee information indicating the usage fee, information indicating the log of the operation executed in the image processing service (step S20). The image processing apparatus 20 (the fee information transmitting unit 205) transmits the generated fee information together with the identification information acquired in step S13 to the server apparatus 10 (step S21).

The server apparatus 10 (the fee information acquisition unit 102) acquires the received later payment ID and fee information (step S22). The server apparatus 10 (the settlement processing unit 103) performs the settlement process.

In the settlement process, the server apparatus 10 settles the usage fee, indicated by the fee information, at the settlement destination identified by the settlement destination information acquired in step S17 and associated with the later payment ID that is common to the fee information (step S23). The later payment settlement process thus ends.

In accordance with the exemplary embodiment, the settlement destination information identifying the settlement destination is stored on the user terminal 30 while also being transmitted to the server apparatus 10. The settlement destination information is neither transmitted to nor stored on the image processing apparatus 20. Even if the settlement destination information is not stored on the image processing apparatus 20 that provides the service for fee, the usage fee for the service is settled at the settlement destination identified by the settlement destination information.

In the settlement assisting system 1, the identification information (the later payment ID in the exemplary embodiment) identifying the use of the image processing service is shared among the apparatuses, the usage fee as a settlement target is determined, and the later payment is thus settled. Used as a way to share the identification information is two-dimensional code that is displayed on the image processing apparatus 20 and read by the user terminal 30. In this way, the identification information is shared among the apparatuses even if the image processing apparatus 20 does not directly wirelessly communicate with the user terminal 30.

In accordance with the exemplary embodiment, ins response to the reception the later payment ID from the server apparatus 10, the image processing apparatus 20 starts providing the image processing service. In this way, the image processing service in the later payment (namely, the image processing service serving as a settlement target) is not provided in a status in which the identification information not shared among the apparatuses. In accordance with the exemplary embodiment, the information indicating the usage fee until the end condition is satisfied is transmitted as the fee information to the server apparatus 10. In this way, a usage fee for a use after the end condition is satisfied is not calculated.

The exemplary embodiment of the disclosure has been described for exemplary purposes only and may be modified as described below. The exemplary embodiment and modifications may be combined as appropriate.

The service providing unit 201 may use an end condition different from the end condition described above. For example, the service providing unit 201 may use the end condition that is satisfied if a distance between the image processing apparatus 20 and the user terminal 30 (hereinafter referred to as an inter-apparatus distance) exceeds a threshold value. In accordance with a modification of the disclosure, the image processing apparatus 20 and the user terminal 30 performs near field communication.

A communicable distance over which the near field communication is possible is used as the threshold value. The service providing unit 201 emits periodically beacons in the near field communication to the user terminal 30. If a reply is received, the service providing unit 201 determines that the end condition is not satisfied. If no reply is received, the service providing unit 201 determines that the inter-apparatus distance exceeds the communicable distance and that the end condition is satisfied. The determination method of determining the inter-apparatus distance is not limited to the method described above.

The user terminal 30 may now include a position fixing device that fixes the position of the user terminal 30 and the position of the image processing apparatus 20 may be known beforehand. In such a case, the service providing unit 201 may calculate an inter-apparatus distance in accordance with the position of the user terminal 30 transmitted from the user terminal 30. In either case, unauthorized use of the image processing service in the later payment (the image processing service serving as a settlement target) by a third party is controlled after the user leaves the image processing apparatus 20.

The service providing unit 201 may use an end condition that is satisfied if the image processing apparatus 20 remains continuously not operated for a constant period of time (time-out condition). In such a case, if the user is present close to the image processing apparatus 20 but does not operate the image processing apparatus 20, the provision of the service serving as a settlement target ends.

In accordance with the exemplary embodiment, the fee information generating unit 204 in the image processing apparatus 20 generates as the fee information the information indicating the log of the operation executed when the service providing unit 201 provides the image processing service. The fee information (operation log) indicates contents provided in the image processing service and is an example of "content information" of the disclosure.

The fee information transmitting unit 205 repeatedly transmits the generated fee information to the server apparatus 10 each time the image processing service responsive to the later payment ID is performed. In accordance with a modification, the fee information transmitting unit 205 deletes the fee information, namely, the operation log from the image processing apparatus 20 each time the fee information has been transmitted. The operation log may include a fax number of the destination if the image processing service is a fax service.

If the image processing service is a print service, the operation log may include a file name of image data to be printed. If these pieces of information are leaked, there is a possibility that the user may lose trust in business. In accordance with the modification, the operation log that is information indicating the contents of the processing service is deleted as described above. The risk of information leak is reduced more than when the log is not deleted.

In accordance with the exemplary embodiment, a determination as to whether the image processing service in the later payment available or not is made by the user terminal 30 that authenticates a user. Similarly, the server apparatus 10 may determine whether the image processing service in the later payment is available or not.

In accordance with a modification, the usage information transmitting unit 303 in the user terminal 30 transmits to the server apparatus 10 not only the later payment ID settlement destination information as the identification information, but also the usage information indicating the unique information of the user terminal 30 or the user of the image processing service. The unique information is information unique to the user terminal 30 or the user and a terminal ID allocated to the user terminal 30 or a user ID allocated to the user.

In accordance with the exemplary embodiment, the terminal ID or the user ID is used as the settlement destination information. In accordance with the modification, however, information different from the unique information is used as the settlement destination information. Upon receiving the unique information indicated by the usage information, the reception notification unit 101 in the server apparatus 10 is the identification information to the image processing apparatus 20 if the received unique information satisfies the usage condition.

The reception notification unit 101 stores beforehand the terminal ID of the user terminal 30 where the image processing service in the later payment is available. If the received terminal ID is stored, the reception notification unit 101 determines that the usage condition is satisfied. If the received terminal ID is not stored, the reception notification unit 101 determines that the usage condition is not satisfied. Only if the reception notification unit 101 determines that the usage condition is satisfied, the reception notification unit 101 transmits notification data to the image processing apparatus 20. The notification data indicates the identification information and also indicates that the use of the image processing service in the later payment has been accepted.

By determining the usage condition as described above, the server apparatus 10 determine the availability of the image processing service in the later payment on each user terminal 30. If the unique information is a user ID, the server apparatus 10 determines the availability of the image processing service on a per user basis. The image processing service includes multiple types of services, such as a print service and a copy service. The type of an available service may be determined on a per piece basis of the unique information.

The reception notification unit 101 stores an availability table of the unique information indicating an available service. FIG. 11 illustrates whether the "print", "scan", "copy", and "fax" services are available in the unique information "U001", "U002", "U003", "U004", "U005". . . .

All the services are yes (available) in the unique information U001, and the services excluding fax are yes in the unique information U002 and U003. The print and copy services involving the use of paper sheet are no (unavailable) in the unique information U004. Only the fax service is yes in the unique information U005 The availability table thus associates the unique information with the available service.

In accordance with a modification, the identification information issuing unit 202 issues the later payment ID indicating the type of the image processing service to be used. For example, later payment ID "PRTxxxx" is issued for the print service, later payment ID "SCMxxxx" for the scan service, later payment ID "CPYxxxx" for the copy service, and later payment ID "FAXxxxx" for the fax service ("x" denotes any number or symbol).

When the unique information is received as described above, the reception notification unit 101 identifies the type of the service to be used from the later payment ID as the identification information that has been transmitted with the unique information. If the identified type of the service is associated with the unique information in the availability table, namely, if the identification information identifying the use of the service associated with the unique information is received together with the unique information, the reception notification unit 101 determines that the usage condition is satisfied.

The apparatus storing the availability table is not limited to the server apparatus 10. The apparatus storing the availability table may be an external apparatus, such as the image processing apparatus 20. In such a case, the reception notification unit 101 references the availability table by accessing the external apparatus. In either case, the available service is restricted on a per terminal basis or on a per user basis in the modification.

The determination of the usage condition in the unique information may account for a usage amount of service. FIG. 12 illustrates a functional configuration implemented by a modification. FIG. 12 illustrates a server apparatus 10*a* that includes a usage fee accumulating unit 104 in addition to the units in FIG. 5. The usage amount of the image processing service is described as below.

In the print service and copy service, the usage amount is a count of paper sheets printed. In the scan service, the usage amount is a count of document paper sheets read. In the fax service, the usage amount is a count of document paper sheets transmitted. As paper sheets or document sheets are larger in size, the usage amount may be set to be larger. Also, color service may be set to have a larger usage amount than monochrome service.

Alternatively, a higher usage amount is set in response to a longer usage time or a higher usage fee for the image processing service. In accordance with a modification, the fee information acquisition unit 102 supplies to the usage fee accumulating unit 104 the acquired later payment ID and the operation log (the fee information). In the same way as described in the modification, the reception notification unit 101 supplies to the usage fee accumulating unit 104 the acquired later payment ID and the unique information on the user terminal 30.

The usage fee accumulating unit 104 stores the operation log, supplied together with the same later payment ID, and the unique information associated with the operation log. The operation log includes information on the usage amount described above. The unique information is associated with the user terminal 30 or the user as previously described with reference to the modification. The usage fee accumulating unit 104 stores the operation log and the unique information associated with the operation log and thus accumulates the usage amount of the image processing service on a per user terminal basis or on a per user basis.

In response to the reception of the unique information indicated by the received usage information, the reception notification unit 101 references the usage amount that has been accumulated on the usage fee accumulating unit 104 in association with the received unique information. If the referenced usage amount is less than a reference value, the reception notification unit 101 determines that the usage condition is satisfied and transmits the later payment ID as the identification information to the image processing apparatus 20. As described above in the modification, the usage amount of the image processing service in the later payment is restricted on a per user terminal basis or on a per user basis.

In accordance with the exemplary embodiment, if the reception notification unit 101 has notified the service providing unit 201 that the use of the image processing service in the later payment has been accepted, the service providing unit 201 provides the image processing service. However, without the notification, the service providing unit 201 may provide the image processing service. In such a case, the service providing unit 201 starts providing the image processing service without waiting for operations in step S14 (acquisition of the identification information) to step S18 (the notification of the acceptance of the use) in FIG. 10. In a modification, the time for which the user is kept waiting before starting using the image processing service is thus shorter than when the notification is Performed.

The identification information acquisition unit 302 in the user terminal 30 may acquire the identification information in a method different from the method described in the exemplary embodiment. In accordance with a modification, the communication device 24 in the image processing apparatus 20 and the communication device 34 in the user terminal 30 communicates with each other via near field communication (NFC).

When the user terminal 30 approaches the image processing apparatus 20, the identification information output unit 203 in the image processing apparatus 20 outputs the identification information via the NFC. The identification information acquisition unit 302 receives and acquires the identification information. In the same way as in the exemplary embodiment, the usage information transmitting unit 303 transmits the identification information thus acquired to the server apparatus 10. The wireless communication in the modification is not limited to the NFC.

For example, wireless communications, such as Bluetooth (registered trademark) or wireless local-area network (LAN) may be used. Any wireless communication is acceptable as long as the wireless communication desirably automatically starts when the user terminal 30 becomes closer to the image processing apparatus 20. In any case, the user terminal may not necessarily include an imaging device as in the exemplary embodiment. Even if a user terminal having no imaging device is used, the identification information may be shared among the apparatuses.

The apparatuses implementing the functions in FIG. 5 are not limited to those illustrated in the drawings. FIG. 13 illustrates the whole configuration of a settlement assisting system 1*b* of a modification. The settlement assisting system 1*b* includes a corporate server apparatus 40 in addition to the apparatuses in FIG. 1. For example, the corporate server apparatus 40 is a server apparatus that provides the image processing service.

In the modification, the corporate server apparatus 40 includes the usage information transmitting unit 303 and the settlement destination information memory 304 in the user terminal 30. The identification information acquisition unit 302 in the user terminal 30 transmits to the corporate server apparatus 40 the later payment ID and apparatus ID acquired in the same way as in the exemplary embodiment. The usage information transmitting unit 303 in the corporate server apparatus 40 associates the received identification information with the settlement destination information stored on the settlement destination information memory 304 and transmits the identification information and the settlement destination information in an associated form to the server apparatus 10.

As described above, the corporate server apparatus 40 is an example of a "first apparatus" of the disclosure. The user terminal 30 does not involve storing the settlement destination information. If the division code or the project code as the settlement destination information is frequently updated, such maintenance may be performed by a corresponding company rather than by each user.

In accordance with the exemplary embodiment, the two functions, one function by the identification information issuing unit 202 and the other by the identification information output unit 203, are implemented by the image processing apparatus 20. Alternatively, the two functions may be implemented by the server apparatus 10 or the user terminal 30. The case in which the two functions are implemented by the server apparatus 10 is described with reference to FIGS. 14A through 14C.

Figure 14A:
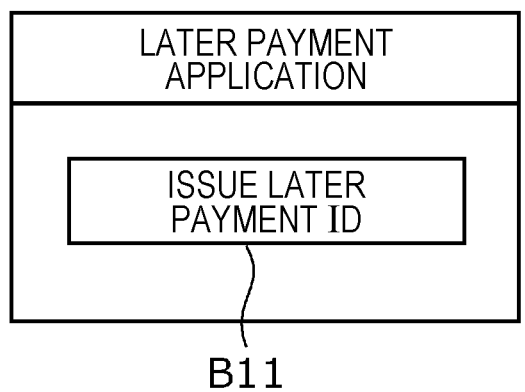
FIGS. 14A through 14C illustrate examples of a screen displayed in a modification.
Figure 14B:
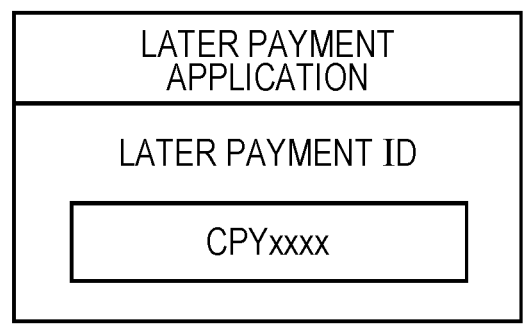
Figure 14C:
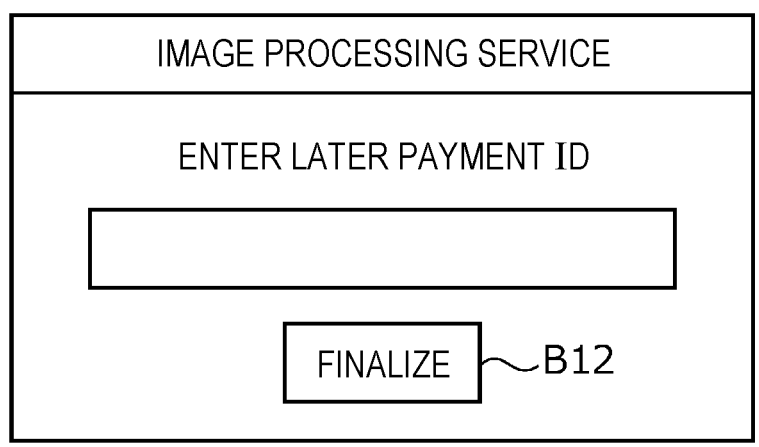

FIGS. 14A through 14C illustrate examples of a screen displayed in a modification. The identification information acquisition unit 302 in the user terminal 30 starts up a later payment app in response to an operation performed by a user and causes the display to display an issue button B11 to issue a later payment ID as illustrated in FIG. 14A. When the issue button B11 is operated, the identification information acquisition unit 302 transmits to the server apparatus 10 request data requesting the issuance of the later payment ID.

In response to the reception of the transmitted request data, the identification information issuing unit 202 in the server apparatus 10 issues the later payment ID and the identification information output unit 203 outputs the later payment ID to the user terminal 30 as a request source. The identification information acquisition unit 302 causes the display to display the output later payment ID as illustrated in FIG. 14B. In response to an operation of the user, the service providing unit 201 in the image processing apparatus 20 causes the display to display an input screen of the later payment ID as illustrated in FIG. 14C.

When a finalize button B12 with the later payment ID input is operated, the service providing unit 201 starts the image processing service. In same way as in the exemplary embodiment, the later payment ID serving as the identification information is shared by the server apparatus 10 and the image processing apparatus 20. A subsequent portion of the later payment settlement process is performed in the same way as in the exemplary embodiment.

The case in which the user terminal 30 includes the identification information issuing unit 202 and the identification information output unit 203 is described below. The identification information issuing unit 202 in the user terminal 30 causes the issue button B11 in FIG. 14A to be displayed and issues the later payment ID if the issue button B11 is operated. The identification information output unit 203 outputs the issued later payment ID to the display of the user terminal 30 and causes the later payment ID to be displayed as illustrated in FIG. 143.

The displayed later payment ID is supplied to the image processing apparatus 20 in response to an operation of the user performed on the input screen in FIG. 14C. If the identification information acquisition unit 302 in the user terminal 30 acquires as the identification information the later payment ID issued on the user terminal 30, the usage information transmitting unit 303 transmits the usage information to the server apparatus 10 in the same way as in the exemplary embodiment. Through the above operation, the later payment ID serving as the identification information is shared by the server apparatus 10 and the image processing apparatus 20 in the same way as in the exemplary embodiment. The later payment settlement process is thus performed in the same way as in the exemplary embodiment.

As long as the functions in FIG. 5 are implemented as an image reading system, the functions may be flexibly shared among the elements. In accordance with each of each of the modifications, the usage fee is associated with the settlement destination information through the identification information shared by the server apparatus 10 and the image processing apparatus 20. The usage fee for the image processing service used in the later payment is settled at the correct settlement destination.

In accordance with the exemplary embodiment, one type of the identification information is issued. Alternatively, two types of the identification information may be issued. In accordance with another modification, the two functions, the function of the identification information issuing unit 202 and the function of the identification information output unit 203, are implemented not only by the image processing apparatus 20 but also by the server apparatus 10. In accordance with the modification, if the reception notification unit 101 accepts the use of the image processing service through the later payment, the reception notification unit 101 notifies the identification information issuing unit 202 in the image processing apparatus 20 that the use of the image processing service has been accepted.

The identification information issuing unit 202 in the server apparatus 10 issues a usage ID as the identification information that is different from the later payment ID issued by the image processing apparatus 20. As the later payment ID, the usage ID is information identifying the use of the image processing service. The identification information output unit 203 in the server apparatus 10 outputs the issued usage ID to both the image processing apparatus 20 and the user terminal 30. The user terminal 30 displays the usage ID on the later payment app screen.

The image processing apparatus 20 displays an input screen with the usage ID in place of the later payment ID in 14C, When the user operates on the displayed input screen, the usage ID is then supplied to the image processing apparatus 20. If the input usage ID matches the usage ID output from the server apparatus 10, the service providing unit 201 in the image processing apparatus 20 determines that the use of the image processing service has been accepted and then starts providing the image processing service to the user.

In accordance with the modification, through the identification information (the usage ID in this modification) shared by the server apparatus 10 and the image processing apparatus 20, the image processing apparatus 20 is notified that the use of the image processing service via the later payment has been accepted. Unauthorized use of the image processing service by a third party is thus more controlled than when the usage ID is not output.

In accordance with the exemplary embodiment, the fee information is the operation log that is information indirectly indicating the usage fee for the image processing service. Information directly indicating the usage fee for the image processing service may be used as the fee information. In such a case, the fee information generating unit 204 in the image processing apparatus 20 calculates the usage fee in accordance with the operation log supplied from the service providing unit 201 and generates the fee information indicating the calculated usage fee.

The services provided by the settlement assisting system 1 are not limited the print, copy, scan, and fax services. For example, the image processing services to be provided may include a translation service, ticket output service, musical score print service, and/or map print service, Services provided are not limited to the image processing service and may include car sharing service, gassing service (particularly, at a self-service gasoline station), railway reservation service, airline ticket reservation service, and/or hotel room reservation service. The settlement assisting system 1 may provide any service as long as the service is for fee.

The functional configuration implemented by the settlement assisting system 1 is not limited to the functional configuration in FIG. 5. In accordance with the exemplary embodiment, the service providing unit 201 in the image processing apparatus 20 performs a determination operation as to whether the use of the image processing service is accepted and performs an operation to provide the image processing service to the user. The two operations may be performed through separate functions.

The operations performed by the fee information generating unit 204 and the fee information transmitting unit 205 may be performed through a single function that generates and outputs the fee information. As long as the functions in FIG. 5 are implemented by the whole image reading system, the range of each function may be flexibly decided.

In the exemplary embodiment above, the term "processor" refers to hardware in a broad sense. Examples of the processor includes general processors (e.g., CPU: Central Processing Unit), dedicated processors (e.g., GPU: Graphics Processing Unit, ASIC: Application Specific Integrated Circuit, FPGA: Field Programmable Gate Array, and programmable logic device).

In the exemplary embodiment above, the term "processor" is broad enough to encompass one processor or plural processors in collaboration which are located physically apart from each other but may work cooperatively. The order of operations of the processor is not limited to one described in the exemplary embodiment above, and may be changed.

The disclosure may include the information processing apparatus, such as the server apparatus, the image forming apparatus, or the user terminal, or the information processing system including the information processing apparatus. The disclosure may include an information processing method that is performed by each of the information processing apparatuses. The disclosure may also include a computer program that causes a computer to control the information processing apparatus. The computer program may be supplied in a recorded form on an optical disk or may be downloaded onto the computer via a communication network, such as the Internet, and installed onto the computer for use.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing system comprising a first apparatus, a second apparatus providing a service for fee, and a server,
   wherein the first apparatus transmits, to the server, identification information and settlement destination information in an associated form, the identification information identifying use of the service, the settlement destination information stored on the first apparatus and identifying a settlement destination of a usage fee for the use of the service,
   wherein the second apparatus first performs an image processing service and subsequently transmits to the server the identification information and fee information in an associated form, the fee information indicating the usage fee for the use identified by the identification information,
   wherein the server settles the usage fee indicated by the fee information at the settlement destination identified by the settlement destination information associated with the identification information,
   wherein the second apparatus wirelessly outputs the identification information, and
   wherein the first apparatus authenticates a user and acquires the received identification information via a function that is available if the user has been authenticated, and transmits the acquired identification information to the server.

2. The information processing system according to claim 1, wherein the second apparatus displays code information indicating the identification information, and
   wherein the first apparatus acquires the identification information read from the displayed code information.

3. The information processing system according to claim 1, wherein the server transmits to the second apparatus the identification information received from the first apparatus, and
   wherein the second apparatus starts providing the service if the identification information has been received from the server.

4. The information processing system according to claim 2, wherein the server transmits to the second apparatus the identification information received from the first apparatus, and
   wherein the second apparatus starts providing the service if the identification information has been received from the server.

5. The information processing system according to claim 3, wherein the first apparatus transmits, to the server, unique information on the first apparatus or a user together with the identification information and the settlement destination information, and
   wherein the server transmits the identification information to the second apparatus if the received unique information satisfies a usage condition.

6. The information processing system according to claim 5, wherein the unique information is associated with a service that is available, and
   wherein the usage condition is satisfied if the unique information and the identification information identifying the use of the service associated with the unique information have been received.

7. The information processing system according to claim 6, wherein a usage amount of the service is accumulated in association with the unique information, and
   wherein the usage condition is satisfied if the usage amount associated with the unique information is less than a specific reference value.

8. The information processing system according to claim 1, wherein the second apparatus transmits to the server, as the fee information, information indicating the usage fee cost throughout a period of time that continues from when the second apparatus starts providing the service until an end condition is satisfied.

9. The information processing system according to claim 8, wherein the end condition is satisfied if a distance between the first apparatus and the second apparatus exceeds a threshold value.

10. The information processing system according to claim 9, wherein the end condition is satisfied if an operation is not input on the second apparatus throughout a constant period of time.

11. The information processing system according to claim 1, wherein the second apparatus repeatedly transmits to the server, as the fee information, content information indicating contents of the service and deletes the content information each time the content information has been transmitted.

12. The information processing system according to claim 1, wherein the first apparatus authenticates a user and transmits the identification information and the settlement destination information to the server via a function that is available if the user has been authenticated.

13. A server comprising:
    a first acquisition unit that acquires, from an external apparatus, identification information identifying use of a service for fee by a user who uses a providing apparatus that provides the user with the service and settlement destination information identifying a settlement destination of a usage fee for the use, the service being an image processing service;

a second acquisition unit that acquires from the providing apparatus the identification information and fee information indicating the usage fee for the use identified by the identification information; and a processing unit that settles the usage fee indicated by the acquired fee information at the settlement destination identified by the settlement destination information associated with the identification information, wherein the providing apparatus wirelessly outputs the identification information to the second acquisition unit, and wherein the external apparatus authenticates a user and acquires the identification information via a function that is available if the user has been authenticated, and transmits the acquired identification information to the first acquisition unit.

\* \* \* \* \*